(12) United States Patent
Shimizu

(10) Patent No.: US 9,055,212 B2
(45) Date of Patent: Jun. 9, 2015

(54) IMAGING SYSTEM, IMAGE PROCESSING METHOD, AND IMAGE PROCESSING PROGRAM RECORDING MEDIUM USING FRAMING INFORMATION TO CAPTURE IMAGE ACTUALLY INTENDED BY USER

(75) Inventor: Saori Shimizu, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 817 days.

(21) Appl. No.: 12/704,103

(22) Filed: Feb. 11, 2010

(65) Prior Publication Data

US 2010/0214449 A1    Aug. 26, 2010

(30) Foreign Application Priority Data

Feb. 17, 2009   (JP) ................................ 2009-034086

(51) Int. Cl.
  *H04N 5/222*  (2006.01)
  *H04N 5/228*  (2006.01)
  *H04N 5/232*  (2006.01)
(52) U.S. Cl.
  CPC ....... *H04N 5/23212* (2013.01); *H04N 5/23219* (2013.01); *H04N 5/23293* (2013.01); *H04N 5/23296* (2013.01)
(58) Field of Classification Search
  USPC ............ 348/333.02, 333.11, 333.12, 240.99, 348/240.2, 208.14, 348, 352
  See application file for complete search history.

(56) References Cited

U.S. PATENT DOCUMENTS

2008/0218596 A1* 9/2008 Hoshino .................... 348/222.1
2010/0013977 A1* 1/2010 Suzuki ..................... 348/333.11

FOREIGN PATENT DOCUMENTS

| JP | 2005-278003 A | 10/2005 |
| JP | 2006-067452 A | 3/2006 |
| JP | 2006-227995 A | 8/2006 |
| JP | 2008-022306 A | 1/2008 |
| JP | 2008-227871 A | 9/2008 |

OTHER PUBLICATIONS

Japanese Office Action dated Dec. 11, 2012 issued in counterpart Japanese Application No. 2009-034086.

* cited by examiner

*Primary Examiner* — Twyler Haskins
*Assistant Examiner* — Carramah J Quiett
(74) *Attorney, Agent, or Firm* — Holtz, Holtz, Goodman & Chick PC

(57) ABSTRACT

Acquired is a photographed image with a framing intended by a photographer. There is provided an imaging system including an operation detection unit for detecting a photographing operation by a photographer; an imaging unit for acquiring a through image prior to the photographing operation and acquiring an actually photographed image with a photographing field angle wider than a photographing field angle set by the photographer when the photographing operation is performed; a framing information acquiring unit for acquiring framing information created based on the through image when the photographing operation is performed, and related to framing in time of the photographing operation or immediately before the photographing information; and a trimming unit for trimming the actually photographed image acquired by the imaging unit based on the framing information.

18 Claims, 15 Drawing Sheets

DISPLAY IMAGE ON DISPLAY MONITOR though image prior to the photographing operation and acquiring an actually photographed image with a photographing field angle wider than a photographing field angle set by the photographer when the photographing operation is performed; a framing information acquiring unit for acquiring framing information created based on the through image and related to framing in time of the photographing operation or immediately before the photographing information, when the photographing operation is performed; and a trimming unit for trimming the actually photographed image acquired by the imaging unit based on the framing information acquired by the framing information acquiring unit.

IMAGING SYSTEM, IMAGE PROCESSING METHOD, AND IMAGE PROCESSING PROGRAM RECORDING MEDIUM USING FRAMING INFORMATION TO CAPTURE IMAGE ACTUALLY INTENDED BY USER

BACKGROUND OF THE INVENTION

1. Field of the Invention

The present invention relates to an imaging system such as a digital camera, an image processing method, and an image processing program recording medium.

This application is based on Japanese Patent Application No. 2009-034086, the content of which is incorporated herein by reference.

2. Description of Related Art

In recent years, functions such as high magnification zoom and electronic zoom, and functions such as macro photographing have advanced in an imaging device such as a digital camera, so that the imaging device can be used as a binocular to readily photograph or check distant objects during travel, and readily photograph insects and flowers in the macro photographing of high photographing magnification thereby contributing to increase in photographing opportunities.

However, in time of photographing of high magnification using high magnification zoom and electronic zoom, framing (composition determination) becomes difficult due to such high magnification, and a subject may run out from a screen due to instability or the like during a release time lag of the digital camera even if the subject is framed at the center of an image, or photographing may be carried out with an unintended framing.

Similar phenomena occur when photographing fast moving objects such as insects in macro photographing and when performing macro photographing of high photographing magnification with the device being held by hand.

In view of such problems, there have been proposed countermeasures such as waiting for a timing when instability has resolved and performing photographing (see e.g., Japanese Unexamined Patent Application, Publication No. 2006-67452), recording information on an entire photographing image other than a portion applied with electronic zoom and a cutout enlarged area by the electronic zoom using an electronic zoom function in time of photographing so as to enable the cutout enlarged area by the electronic zoom to be subsequently changeable if the electronic zoom is not as intended (see e.g., Japanese Unexamined Patent Application, Publication No. 2005-278003).

BRIEF SUMMARY OF THE INVENTION

The present invention adopts the following solutions.

According to a first aspect of the present invention, there is provided an imaging system including: a photographing operation detection unit for detecting a photographing operation by a photographer; an imaging unit for acquiring an actually photographed image with a photographing field angle wider than a photographing field angle set by the photographer when the photographing operation is performed; a framing information acquiring unit for acquiring framing information related to framing in time of the photographing operation or immediately before the photographing operation, when the photographing operation is performed; and a trimming unit for trimming the actually photographed image acquired by the imaging unit based on the framing information acquired by the framing information acquiring unit.

According to a second aspect of the present invention, there is provided an imaging system including: a photographing operation detection unit for detecting a photographing operation by a photographer; an imaging unit for acquiring a The "through image" refers to an image taken prior to actual photographing in an imaging device capable of photographing a still image such as a digital camera.

The "photographing operation" refers to an action by a photographer of fully pushing a shutter button, for example.

The "immediately before the photographing operation" refers to a period in a few hundred ms order from the time of photographing operation, and specifically a period within 500 ms from the time of photographing operation. The period from the photographing operation can be determined based on a period from the timing the photographer intends to photograph and then actually pushes the shutter button to the timing the camera recognizes the pushed shutter button. Generally, the period from the timing a photographer intends to photograph to the timing the photographer pushes the shutter button is about 50 ms to 400 ms, so that this period from the photographing operation can be determined based on a value obtained by adding to such a period the period for the camera to recognize the pushed shutter button.

According to a third aspect of the present invention, there is provided an image processing method including the steps of: detecting a photographing operation by a photographer; acquiring an actually photographed image with a photographing field angle wider than a photographing field angle set by the photographer when the photographing operation is performed; acquiring framing information related to framing in time of the photographing operation or immediately before the photographing information, when the photographing operation is performed; and trimming the actually photographed image based on the framing information.

According to a fourth aspect of the present invention, there is provided an imaging processing program recording medium for causing a computer to execute the steps of: acquiring an actually photographed image with a photographing field angle wider than a photographing field angle set by a photographer when a photographing operation is performed by the photographer; acquiring framing information related to framing in time of the photographing operation or immediately before the photographing information, when the photographing operation is performed; and trimming the actually photographed image based on the framing information.

DETAILED DESCRIPTION OF THE INVENTION

An image processing device and an imaging system according to each embodiment of the present invention will be described below with reference to the drawings.

First Embodiment

Figure 1:
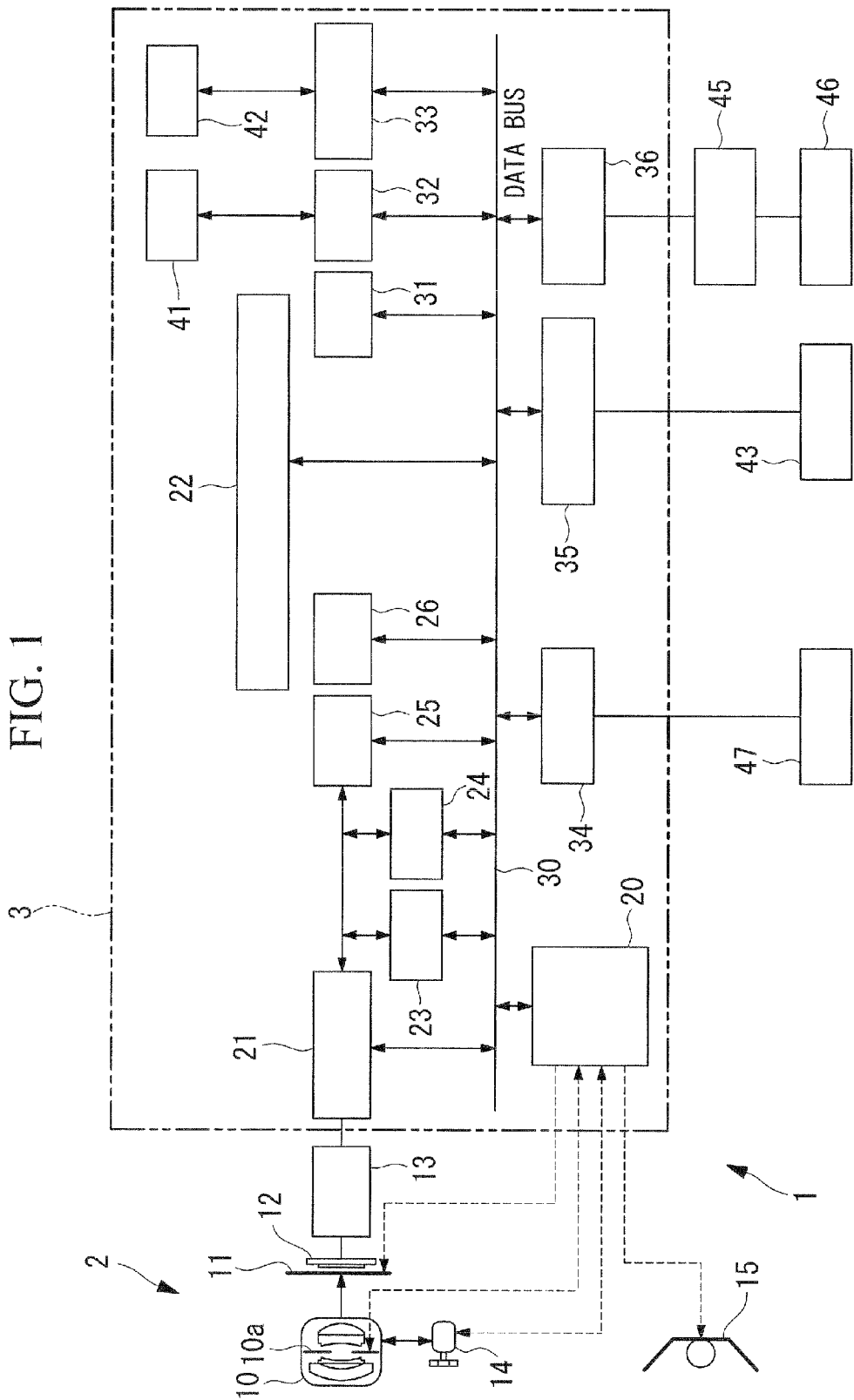
FIG. 1 is a block diagram showing a schematic configuration of an imaging system according to a first embodiment of the present invention.

FIG. 1 is a block diagram showing a schematic configuration of an imaging system according to the first embodiment of the present invention. An imaging system 1 according to the present embodiment is a digital camera, for example, and includes an imaging unit 2 and an image processing device 3. The imaging unit 2 includes a lens 10, a shutter 11, a CCD 12, a CCD control unit 13, a lens drive unit 14, and an electrical flash 15.

The lens 10 is provided with a photographing lens for focus adjustment and focal length adjustment, and an aperture 10a for adjusting an opening amount. The aperture 10a adjusts the brightness and the depth of light applied onto an imaging surface based on a control command from a photographing control unit 20, but an ND filter for light quantity adjustment may be alternatively used for the purpose of brightness adjustment in an inexpensive imaging system with less necessity for depth adjustment.

The lens 10 is driven when a lens drive unit 14 is actuated by the control of the photographing control unit 20. Focusing, zoom drive, and the like are carried out based on a control command from the photographing control unit 20. The electrical flash 15 can irradiate the subject with light by the control of the photographing control unit 20.

The shutter 11 for exposure time control is arranged at the back side of the lens 10. The shutter 11 is drive controlled by the photographing control unit 20.

The shutter 11 is always opened in time of through image photographing. In this case, the exposure amount control of the CCD 12 is realized with use of an electronic shutter function of the CCD 12. The exposure amount to the CCD 12 is controlled by the shutter 11 in time of photographing the so-called still image (hereinafter referred to as "still photographing").

The CCD 12 serving as a two-dimensional imaging element is arranged at the back side of the shutter 11, and photoelectrically converts a subject image formed by the lens 10 to an electric signal. The CCD is used as the imaging element in the present embodiment, but the present invention is not limited thereto and it should be recognized that a two-dimensional imaging element such as a CMOS (Complementary Metal Oxide Semiconductor) may be used.

The CCD control unit 13 is connected to a CCD interface 21. The CCD control unit 13 receives a control signal from a sequence controller (hereinafter referred to as "body CPU"), to be described later, through the CCD interface 21, performs ON/OFF control and the like of a power supply of the CCD 12 based on the control signal, adjusts the timing of imaging, and performs amplification (gain adjustment) and the like of the photoelectric conversion signal.

An analog image signal acquired by the CCD 12 is converted to a digital signal by the CCD interface 21 and is input to the image processing device 3.

The image processing device 3 is, for example, an ASIC, and includes the photographing control unit 20, the CCD interface 21, the body CPU 22, a luminance calculation unit 23, an AF calculation unit 24, an image processing unit 25, a face detection unit 26, and the like. The respective units are mutually connected through a data bus 30 in the image processing device 3.

The body CPU 22 controls each of the units included in the imaging system 1.

The luminance calculation unit 23 averages the image signals in each of predetermined divided areas, converts the same to luminance signals, and calculates luminance distribution information on the subject.

The AF calculation unit 24 divides the image signals into predetermined regions, calculates contrast information for each of the regions, and drives the lens 10 so that the contrast of the predetermined regions becomes a maximum in synchronization with the control of the lens drive unit 14 to focus on the subject.

The image processing unit 25 performs various types of image processes such as OB subtraction, color correction, tone conversion, a monochrome/color mode process, and a through image process on the image signal acquired by the imaging unit 2. The details on the processes implemented by the image processing unit 25 will be described later.

The face detection unit 26 creates an image of a size suited for face detection based on the image signal, extracts a face candidate region by searching a portion with a feature quantity similar to parts of a face in a image to be processed with use of a known technique disclosed in Japanese Unexamined Patent Application, Publication No. 2006-227995 or the like, makes a determination regarding whether or not a face is included using various information on the face candidate region, and detects the position and the size of the face region.

A more specific face detection method may be, for example, of Viola-Jones disclosed in P. Viola and M. Jones, "Rapid object detection using a boosted cascade of simple features," Proc. of CVPR, 2001. The Viola-Jones face detection method is for detecting a face by matching a rectangular filter most suited for face detection selected by the Adaboost learning with a face detection target image. The speed of the process is increased by arranging the rectangular filters in a cascade form. The matching results with the rectangular filters are integrated and standardized as an evaluation value in time of the detection process, and, when the face is detected in the process, the evaluation value is outputted together with the face detection result as an index representing the reliability of the detected face. In the present embodiment, the index is described as face detection reliability and is used in a sequence with used of the face detection result as an index representing the likelihood of the detected face.

In addition to the above-described components, the data bus 30 is connected with a compression unit 31, an SDRAM (Synchronous Dynamic Random Access Memory) control unit 32, a flash memory control unit 33, an operation detection unit 34, a recording medium control unit 35, a video signal output unit 36, and the like.

The compression unit 31 is a block for compressing image data and the like stored in the SDRAM 41 to be described later into the JPEG form. The image compression is not limited to the JPEG, and other compression methods may be applied. The flash memory control unit 33 is connected to a flash memory 42. The flash memory 42 stores an image processing program for controlling each of the processes in the imaging system 1, and the body CPU 22 controls each of the units according to the program stored in the flash memory 42. The flash memory 42 is an electrically rewritable non-volatile memory. The SDRAM 41 is connected to the data bus 30 through an SDRAM control unit 32. The SDRAM 41 is a memory for temporarily storing image information image processed by the image processing unit 25, and the like, or image information compressed by the compression unit 31.

The photographing control unit 20 is connected to each of the units such as the body CPU 22 through the data bus 30. The recording medium control unit 35 is connected to a recording medium 43, and controls recording of image data and the like in the recording medium 43. The recording medium 43 is configured by a rewritable recording medium such as an xD picture card (registered trademark), a compact flash (registered trademark), an SD memory card (registered trademark), a memory stick (registered trademark), a hard disc drive (HD), or the like, and is removable from the imaging system main body.

The video signal output unit 36 is connected to a display monitor 46 through a display monitor control unit 45. The video signal output unit 36 is a circuit for converting image data stored in the SDRAM 41 or the recording medium 43 to a video signal to be used for display on the display monitor 46. The display monitor 46 is, for example, a liquid crystal display device arranged on the rear surface of the imaging system main body, but is not limited to the rear surface as long as being positioned where the photographer can observe. Further, the display monitor 46 is not limited to the liquid crystal display device but may be of other type.

The operation unit 47 includes a switch for detection of a release indicating a photographing instruction of the imaging system 1, as well as, a mode dial, a power switch, a control dial, a play button, a menu button, a cross key, an OK button, and the like, and is connected to the data bus 30 through the operation detection unit 34.

Figure 2:
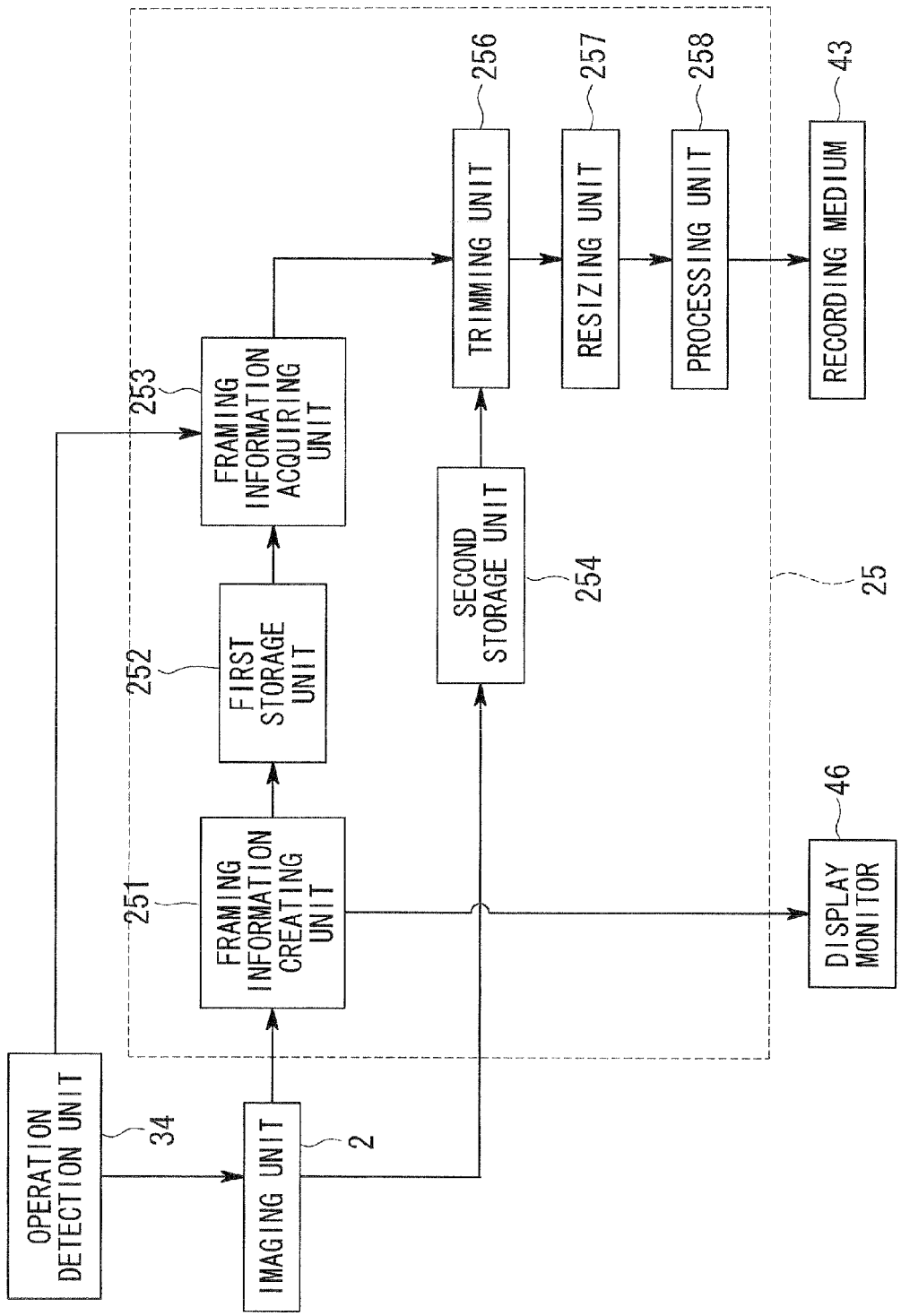
FIG. 2 is a functional block diagram with main functions for a framing process in the image processing device shown in FIG. 1 being extracted and described.

The configuration related to framing, which is a characteristic of the present invention, will be described below. FIG. 2 is a functional block diagram with the main functions for the framing process in the image processing device 25 being extracted and described.

As shown in FIG. 2, the image processing device 25 includes a framing information creating unit 251, a first storage unit 252, a framing information acquiring unit 253, a second storage unit 254, a trimming unit 256, a resizing unit 257, and a processing unit 258. The image processing unit 25 itself may include the first storage unit 252 and the second storage unit 254, or the SDRAM 41 (see FIG. 1) and the like may be used therefor.

The framing information creating unit 251 cuts out a region framed by the photographer from the through image, and stores an image corresponding to this region as framing information in the first storage unit 252 as well as displays the same on the display monitor 46.

Figure 3A:
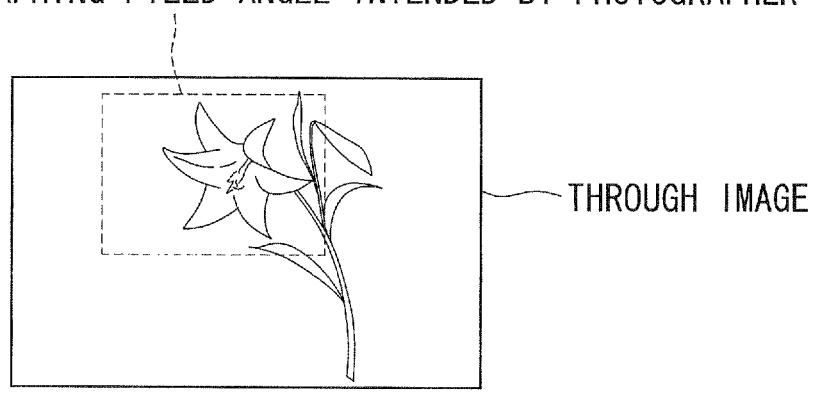
FIG. 3A is a view for describing a display image shown in a through image.
Figure 3B:
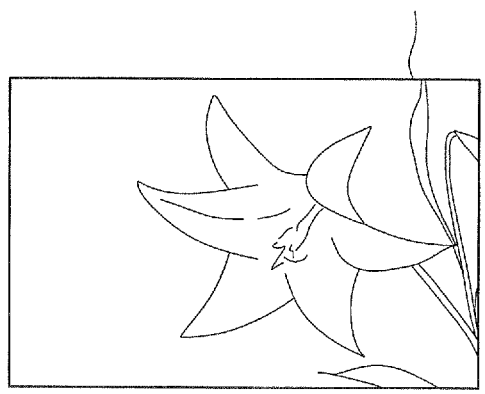
FIG. 3B is a view for describing a display image shown on a display monitor.

For instance, the imaging system 1 expected in the present embodiment is capable of photographing at a photographing field angle wider than a photographing field angle set by the photographer. Specifically, the imaging system 1 has an electronic zoom function. As shown in FIG. 3A and FIG. 3B, for example, an image of a predetermined photographing field angle is acquired as a monitor moving image (through image) for photography check regardless of use of the electronic zoom, and at the same time, an image cut out from the through image (FIG. 3B) is displayed on the display monitor 46 based on the photographing field angle set by the photographer. When the magnification of the electronic zoom becomes large, an image enlarged according to the zoom is displayed on the display monitor 46, but the photographing field angle of the through image inputted to the framing information creating unit 251 becomes constant irrespective of the magnification of the electronic zoom.

The through image is repeatedly acquired at a constant time interval. The through image is cut out at the photographing field angle set by the photographer by the framing information creating unit 251 to be displayed on the display monitor 46, and a predetermined image process is performed on the cutout image to generate framing information and the generated framing information is stored in the first storage unit 252 as needed.

When the photographing operation of the operator is detected by the operation detection unit 34, the framing information acquiring unit 253 acquires the framing information acquired immediately before the photographing operation from the first storage unit 252, and outputs the framing information to the trimming unit 256.

As described above, the imaging unit 2 repeatedly acquires the through image prior to the photographing operation based on the control of the image processing device 3, performs the actual photographing when the photographing operation is detected by the operation detection unit 34 and stores the actually photographed image in the second storage unit 254.

The trimming unit 256 sets a cutout region based on the framing information acquired by the framing information acquiring unit 253 on the actually photographed image stored in the second storage unit 254, cuts out (trims) the image according to the cutout region, and outputs the actually photographed image thus cutout to the resizing unit 257.

The resizing unit 257 corrects the size of the cutout actually photographed image, and outputs the same to the processing unit 258. The processing unit 258 performs various types of image processes such as white balancing and a tone process on the actually photographed image inputted from the resizing unit 257, and stores the actually photographed image thus processed in the recording medium 43.

Figure 4:
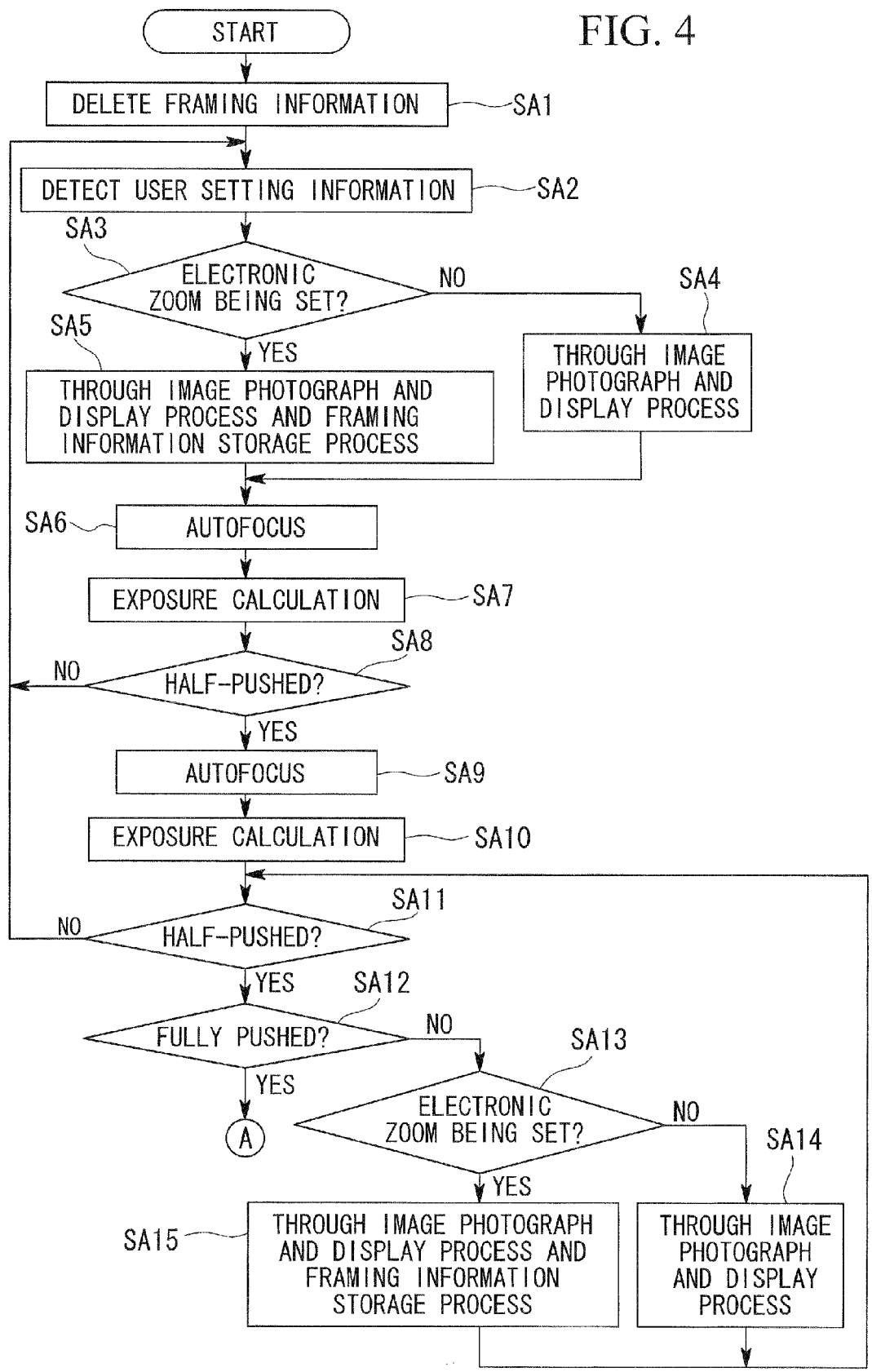
FIG. 4 is a view showing an outline of a sequence flow from power ON to acquiring an image based on framing intended by a photographer.

The operation of the imaging system 1 having the above configuration will be described below with reference to FIGS. 4 to 9. FIG. 4 is a view showing an outline of a sequence flow power ON to acquiring the actually photographed image based on the framing cutout by the photographer.

In FIG. 4, the memory for framing is cleared when the power of the digital camera is turned ON by the photographer (step SA1). The framing information stored in the first storage unit 252 shown in FIG. 2 is then deleted. The user setting information such as the photographing mode and zoom is detected next (step SA2). The user setting is carried out by the operation detection unit 34 (see FIG. 1), for example.

Subsequently determined is whether or not the electronic zoom is set in the user setting (step SA3). If the electronic zoom is not set as a result ("NO" in step SA3), the through image photograph and display process is performed (step SA4), and then the autofocus (step SA6) and the exposure calculation (step SA7) are performed. On the other hand, if the electronic zoom is set in the user setting ("YES" in step SA3), the through image photograph and display process and the framing information storage process are performed (step SA5), and then the autofocus (step SA6) and the exposure calculation (step SA7) are performed. The details on the through image photograph and display process and the framing information storage process will be described later.

Whether or not the shutter button is half-pushed is then determined (step SA8), and the process returns to step SA2 if not half-pushed and the processes after step SA2 are repeatedly performed. If the shutter button is half-pushed, the autofocus (step SA9) and the exposure calculation (step SA10) are performed, and thereafter, whether or not the half-pushed state is released is again determined (step SA11).

If the half-pushed state is released as a result ("NO" in step SA11), the process returns to step SA2. If the half-pushed state is continued, whether or not the shutter button is fully pushed is determined (step SA12). Whether or not the electronic zoom is set is determined (step SA13) if the shutter button is not fully pushed and the half-pushed state is still continued as a result ("NO" in step SA12). In a case where the electronic zoom is not set, the process returns to step SA11 after performing the through image photograph and display process (step SA14). On the other hand, the process returns to step SA11 after performing the through image photograph and display process and the framing information storage process (step SA15) if the electronic zoom is set, and the processes after step SA11 are repeatedly performed.

Figure 5:
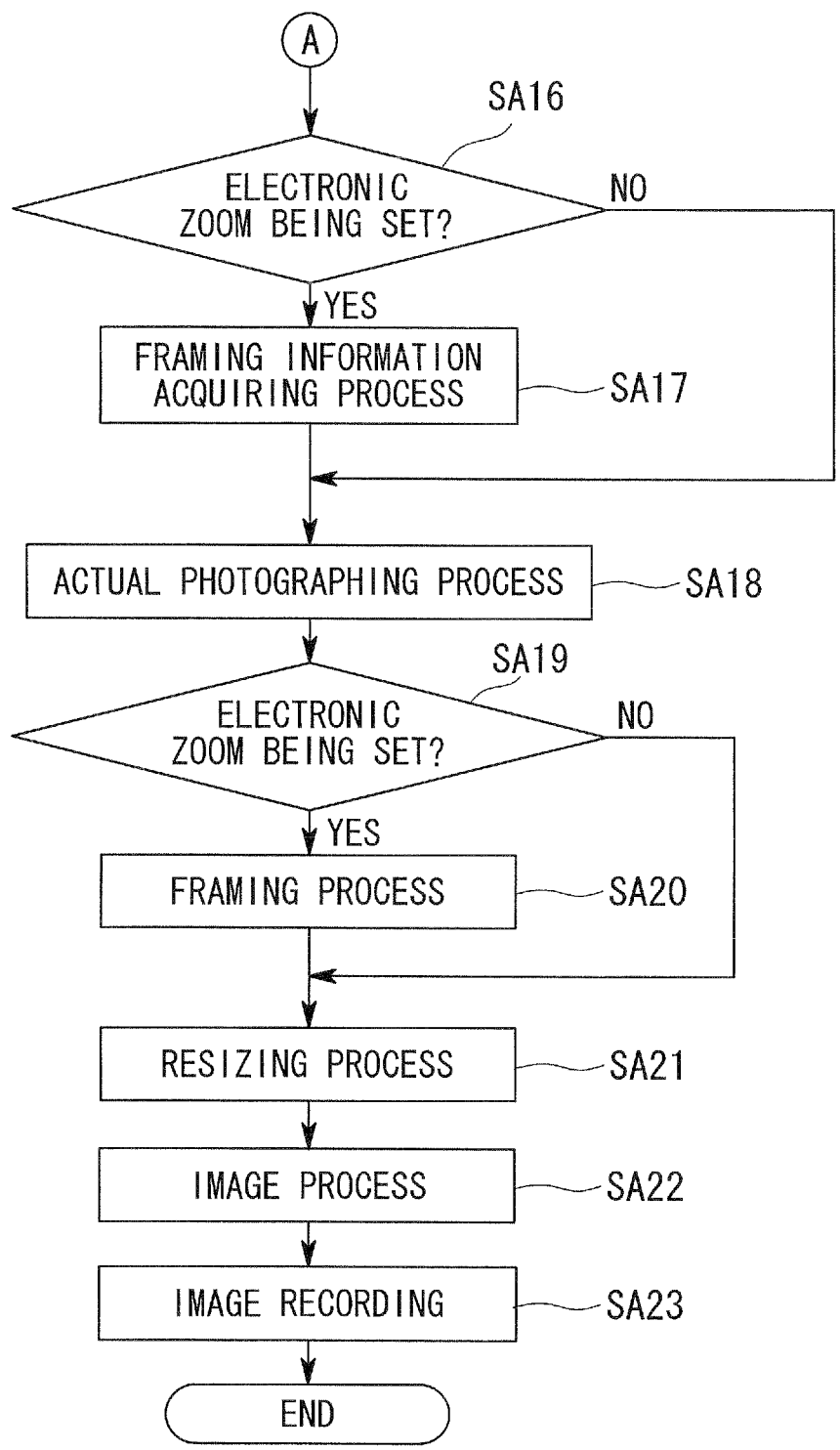
FIG. 5 is a view showing an outline of a sequence flow from power ON to acquiring the image based on framing intended by the photographer.

If determined that the shutter button is fully pushed in step SA12 ("YES" in step SA12), whether or not the electronic zoom is set is determined (step SA16 of FIG. 5). If the electronic zoom is set as a result, the framing information acquiring process (step SA17) is executed, and then the actual photographing process is performed (step SA18). On the other hand, if the electronic zoom is not set, the actual photographing process is performed (step SA18) without performing the framing information acquiring process.

Thereafter, whether or not the electronic zoom is set is determined (step SA19). If the electronic zoom is set, after the framing process is performed (step SA20), the resizing process (step SA21), the image process (step SA22), and then the image recording (step SA23) are performed. On the other hand, if the electronic zoom is not set, the framing process is not performed, but the resizing process (step SA21) and the image process (step SA22) are performed on the actually photographed image, and then the image is stored (step SA23).

[Through Image Photograph and Display Process and Framing Information Storage Process]

Figure 6:
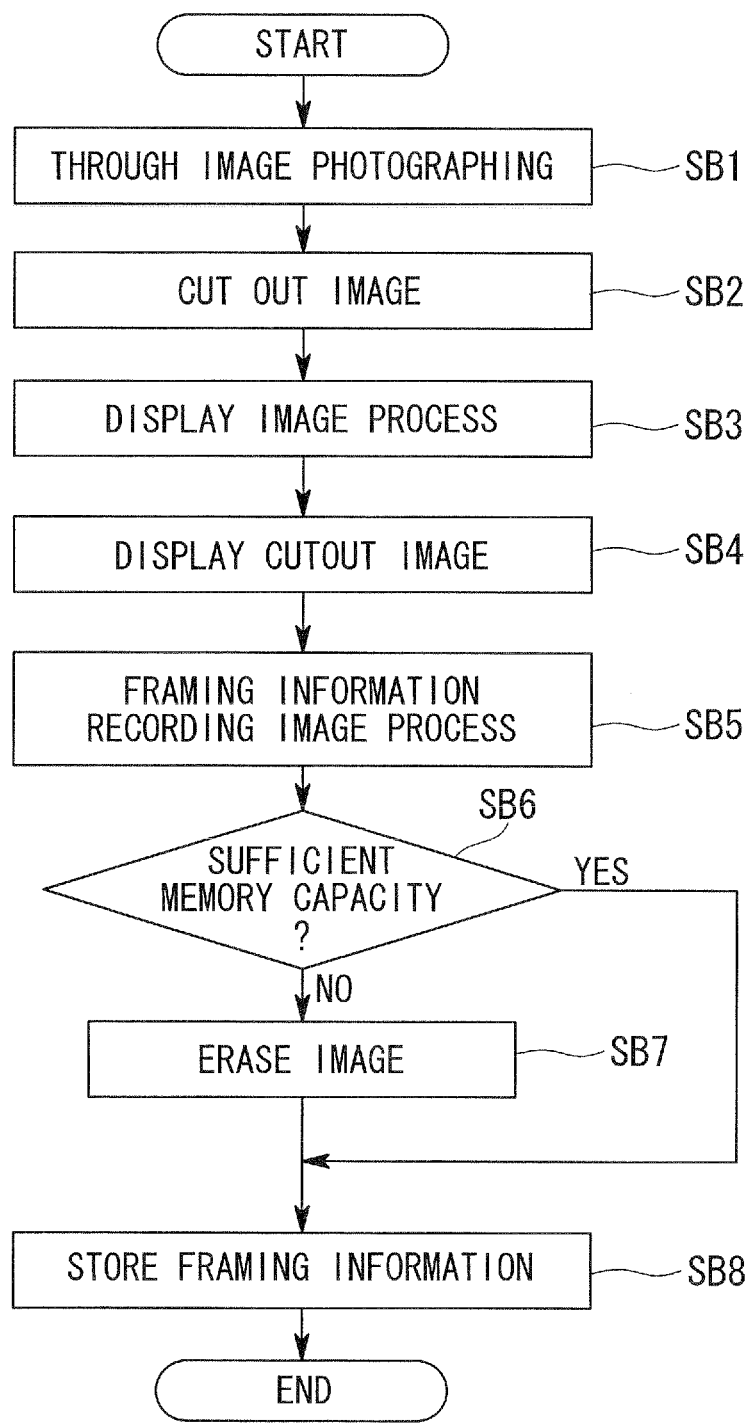
FIG. 6 is a flowchart showing processing procedures of a through image photograph and display process and a framing information storage process.

The through image photograph and display process and the framing information storage process performed in step SA5 and step SA15 will be described below with reference to FIG. 6. FIG. 6 is a flowchart showing the processing procedures of the through image photograph and display process and the framing information storage process. The through image photograph and display process and the framing information storage process are performed by the framing information creating unit 251 shown in FIG. 2.

In FIG. 6, when the through image is photographed (step SB1), an image is cutout from the through image (step SB2). The cutout from the through image is performed by cutting out an image corresponding to the photographing field angle set by the photographer from the through image. In this case, the cutout area is calculated with the middle of the through image as the center from the focal length set by the photographer, the actually photographed image size and the focal length.

Various types of known image processes such as OB subtraction, the tone process, $\gamma$ conversion, and the auto white balance process are performed on the cutout through image (step SB3), and the through image having passed through the image processes is displayed on the display monitor 46 (see FIG. 2) (step SB4). The framing information is created by further performing the image reduction process, the monochrome process, and the like on the through image used for displaying.

Subsequently, whether or not the memory capacity of the first storage unit 252 is sufficient is determined (step SB6). If the memory capacity sufficient to save the framing information created this time, that is, the through image having passed through the image processes can be secured, the framing information is stored in the first storage unit 252 (step SB8), and this process is terminated. If the memory capacity is not sufficient to store the framing information, the memory capacity is secured by deleting the oldest framing information saved in the first storage unit 252 (step SB7), the framing information created this time is stored in the first storage unit 252 (step SB8), and this process is then terminated.

In the present embodiment, the trimmed monochrome reduced image acquired by further performing processes such as the image reduction process and the monochrome process on the through image acquired in step SB4 described above is assumed as the framing information and such framing information is created. However, the present invention is not limited to the method and the framing information may be created by performing a different image process on the through image acquired in step SB4.

Alternatively, the through image acquired in step SB4 may be regarded as the framing information, which may be stored as is in the first storage unit 252.

[Framing Information Acquiring Process]

The framing information acquiring process performed in step SA17 of FIG. 5 will be described below. The framing information acquiring process is performed by the framing information acquiring unit 253 shown in FIG. 2.

First, when information indicating that the shutter button is fully pushed is inputted from the operation detection unit 34, the second newest through image at the time when the shutter button is fully pushed is read out from the first storage unit 252 as the framing information by the framing information acquiring unit 253 (see FIG. 2), and the read frame information is outputted to the trimming unit 256.

Figure 7:
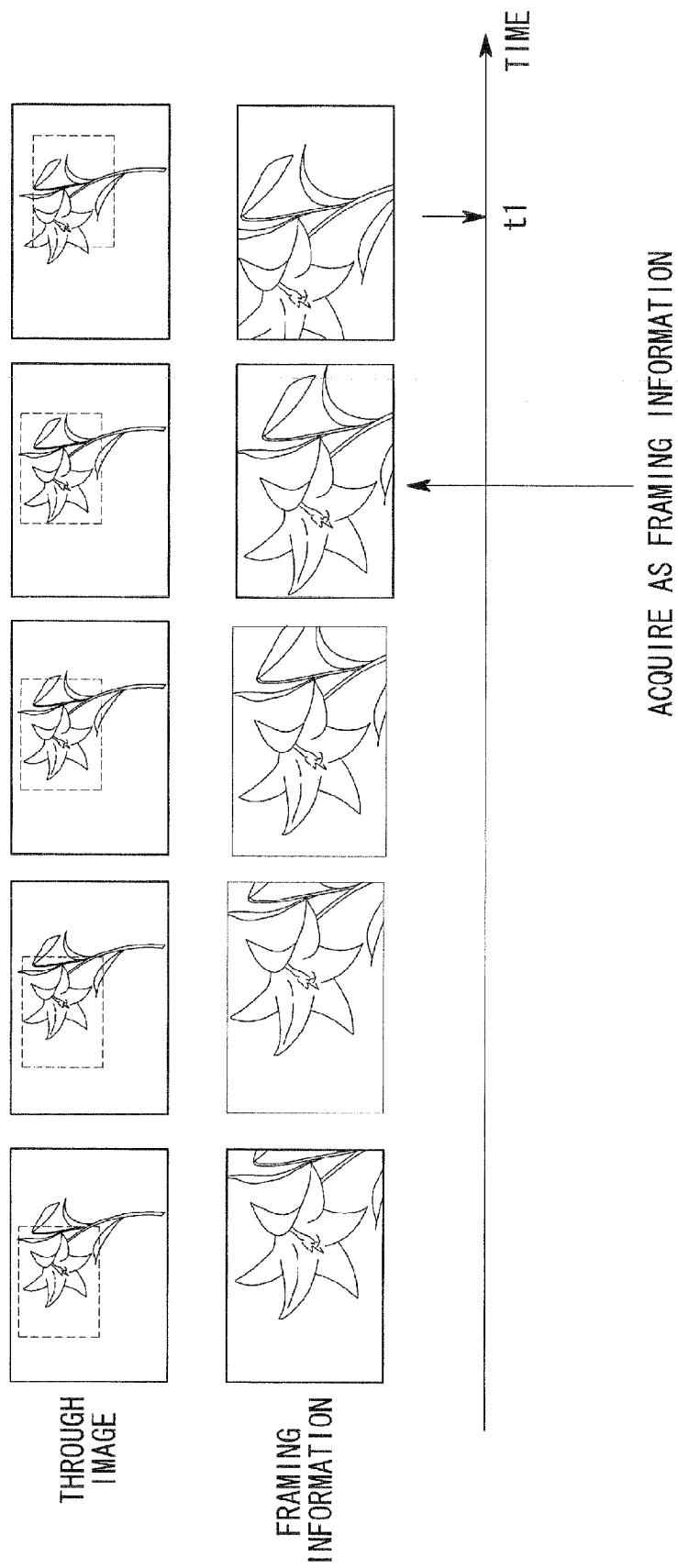
FIG. 7 is a view for describing selection of the framing information.

FIG. 7 is a view for describing selection of the framing information. In FIG. 7, the upper portion shows the through images acquired by the imaging unit 2 and the lower portion shows the framing information stored in the first storage unit 252, that is, the through image having cut out from the through image in the upper portion and having passed through predetermined image processes, such images being shown along the time axis. In other words, the more recent through image is shown on the right. In this case, if the operation detection unit 34 detects that the shutter button is fully pushed, that is, the photographing operation by the photographer is detected at time t1, the framing information acquiring unit 255 acquires the framing information acquired immediately before time t1 from the first storage unit 252, and outputs the framing information thereof to the trimming unit 256.

[Framing Process]

Figure 8:
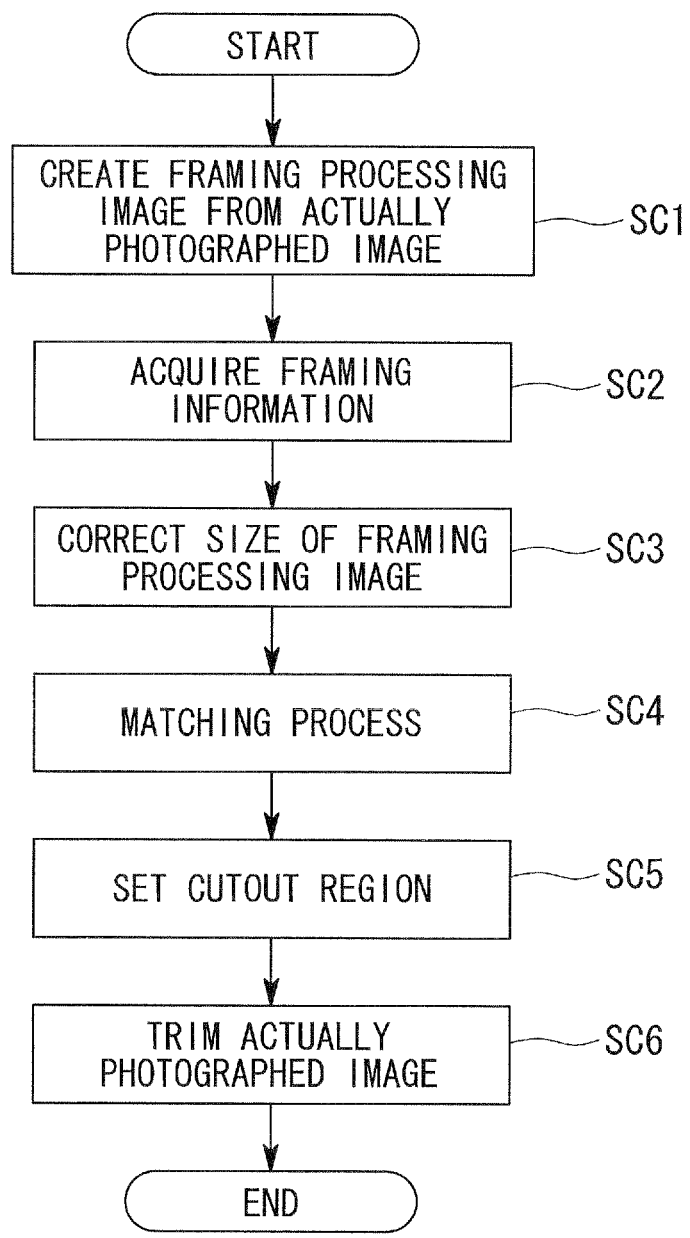
FIG. 8 is a flowchart showing processing procedures of the framing process.

The framing process performed in step SA20 of FIG. 5 will be described below with reference to FIG. 8. FIG. 8 is a flowchart showing the processing procedures of the framing process. The framing process is performed by the trimming unit 256 shown in FIG. 2.

In FIG. 8, the actually photographed image is first acquired, and the known processes such as the OB subtraction process, the tone conversion process, the white balance adjustment process, and the monochrome process are performed on the actually photographed image to create an image (hereinafter referred to as "framing processing image") appropriate to be compared with the framing information (step SC1). In this case, an original image of the actually photographed image is assumed to be stored in the second storage unit 254, and a copy of the actually photographed image is processed and used.

The framing information selected by the framing information acquiring unit 253 is then acquired (step SC2), and the size of the framing processing image is corrected so as to have the photographing field angle same as that of the acquired framing information (step SC3).

The matching process is then applied to the framing processing image of the corrected size and the framing information so as to determine the framing position (step SC4). The details of the matching process performed here will be described later.

Subsequently, the cutout region in the actually photographed image stored in the second storage unit 254 is set based on the information on the center coordinate of the framing position determined by the matching process, the focal length set by the photographer, and the like (step SC5), the actually photographed image is trimmed in the set cutout region (step SC6), and the framing process is terminated. The actually photographed image thus cut out is outputted to the resizing unit 257 (see FIG. 2), and the subsequent processes such as size adjustment are performed.

[Matching Process]

The matching process performed in step SC4 described above will be described below with reference to FIG. 9.

Figure 9:
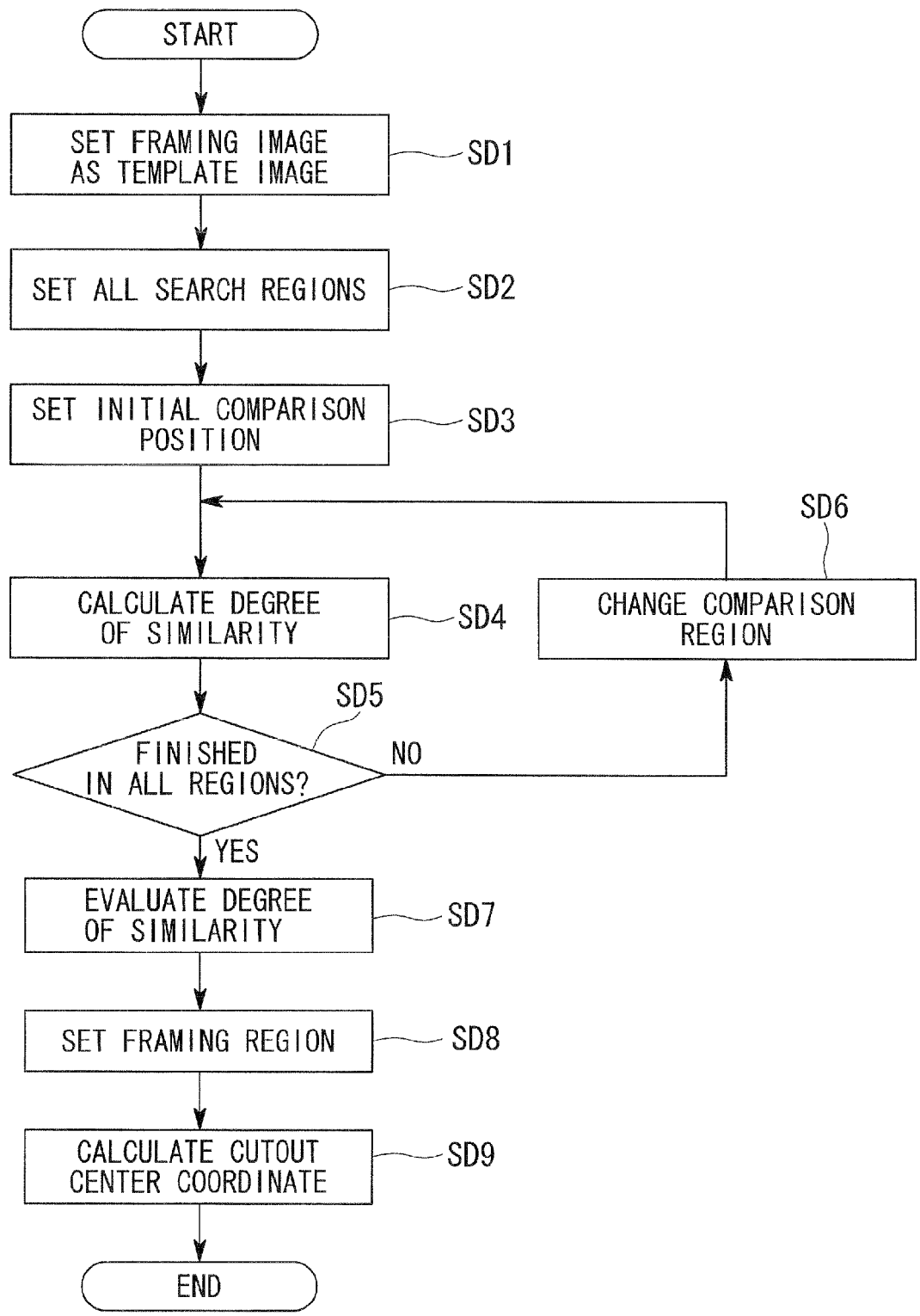
FIG. 9 is a flowchart showing processing procedures of a matching process.

In FIG. 9, the framing information is set as a template image (step SD1), and thereafter, a search area is set on the framing processing image based on the photographing field angle of the actually photographed image, and the user set photographing field angle and the focal length, and fineness of the search is set (step SD2).

A comparison initial position is set within the search area set on the framing processing image (step SD3), and the degree of similarity between the template image and the framing processing image is calculated at the set comparison position (step SD4). The calculation of the degree of similarity is carried out by calculating the difference in the pixel values of the pixels at the corresponding positions and calculating the integrated value of all the differences as the degree of similarity. The method of calculating the degree of similarity is not limited to the one described above. For example, the histogram of each image may be calculated and the degree of similarity of the histograms may be regarded as the degree of similarity of the images. Further alternatively, the degree of similarity may be obtained by adding color information.

Whether or not the calculations of the degree of similarity are finished over the entire search region is then determined (step SD5), and, in a case where the calculations are not finished, the comparison position is changed (step SD6) to repeat the calculations of the degree of similarity (step SD4).

When the calculations of the degree of similarity are finished over the entire search region ("YES" in step SD5), the degree of similarity at each of the positions calculated in step SD4 is evaluated, the comparison position with the highest degree of similarity is specified (step SD7), and the framing region, that is, the cutout region, is set on the framing processing image based on the comparison position and the size of the template image (step SD8). The center coordinate of the cutout region thus set is then calculated (step SD9), and the matching process is terminated.

In the above example, the framing region is set on the framing processing image by template matching. Alternatively, other known methods may be used as long as the photographing field angle closest to the framing information can be estimated. When creating the template image, the color information may be kept to take the degree of similarity of color may into consideration. Moreover, the search region and the search method are not limited to those of the above method. A method used in known tracking and the like may be used.

The matching may be performed using a different angle. The instability or the like in the diagonal direction by the photographer can be solved by changing the angle, so that accuracy of matching can be enhanced. The subject may be detected from the framing information, and only the peripheral portion of the subject may be cut out for block matching. In such a case, the position of a high degree of similarity for the subject is specified and the position of the subject portion in the framing information is specified, and the center coordinate of the cutout region is calculated using such specified information so as to have the target image angle intended by the photographer.

As described above, according to the image processing device and the imaging system of the present embodiment, the through image is acquired prior to the actual photographing, the through image is cut out based on the photographing field angle set by the photographer to create the framing information, so as to store such information. When the photographing operation is performed by the photographer, the framing information acquired immediately before the photographing operation is selected from the stored framing information, and the actually photographed image is trimmed using this selected framing information. Thus, according to the imaging system of the present embodiment, the framing immediately before the photographing operation is performed is assumed as the framing truly desired by the photographer, and the actually photographed image is trimmed to match such framing in order to create the final image. The photographing image by the framing desired by the photographer thus can be acquired even if the actually photographed image is acquired in the framing different from that intended by the photographer due to instability or the like occurring during the actual photographing.

In the present embodiment, the framing information acquired immediately before the shutter button is fully pushed is used, as shown in FIG. 7, when determining the framing information used to cut out the actually photographed image from the framing information stored in the first storage unit 252, but the method of determining the framing information is not limited thereto.

For instance, the framing information acquired a predetermined period before from the time the shutter button is fully pushed may be used. The predetermined period is a several hundred ms order, for example, and is specifically determined within a range from 0 ms to 500 ms. More specifically, 100 ms may be set in advance as the predetermined period, and the framing information acquired 100 ms before the time the shutter button is detected to be fully pushed may be used.

Furthermore, the framing information may be specified by the number of shots instead of time as described above. For instance, the framing information acquired a predetermined number of shots before the time the shutter button is fully pushed may be used. The predetermined number of shots is greater than or equal to zero and less than seven shots when the frame rate is 30 shots/second. More specifically, five shots may be set in advance as the predetermined number of shots, and when the shutter button is fully pushed, the framing information acquired five shots before the time the shutter button is detected to be fully pushed may be used. More specifically, the number of shots is desirably changed depending on the frame rate in time of photographing the through images.

Second Embodiment

A second embodiment of the present invention will be described below.

In the first embodiment described above, the actually photographed image is cut out based on the framing information when the electronic zoom is used, while in the second embodiment, application is made to the entire photographing system for acquiring an actually photographed image of a photographing field angle wider than that set by a photographer with no limitation to the electronic zoom by also taking into consideration the photographing magnification, and the like.

In this case, there is provided a framing priority mode in which an actually photographed image is cut out using the framing information obtained before the shutter button is fully pushed, and control is made such that photographing is performed with a field angle range wider than the field angle set by the photographer in the framing priority mode. When set in the framing priority mode, the framing processes and the like are performed on the actually photographed image using the framing information as in the first embodiment. Thus, in comparison to the first embodiment in which whether or not to cut out an image based on the framing information is determined depending on whether or not the electronic zoom is set, in the second embodiment, whether or not to cut out an image using the framing information is determined depending on whether or not the framing priority mode is set.

Thus, photographing can be carried out such that a subject does not run out from a frame even when, for example, a focal length is not long and framing is difficult, specifically, when performing macro photographing with high photographing magnification a rapidly moving insect by cutting out the actually photographed image based on the framing information obtained before the photographing operation also in the imaging system for performing actual photographing with the photographing field angle wider than the that set by the photographer even not in the electronic mode. Furthermore, accuracy can be enhanced by changing the ratio of the actually photographed image and a margin portion according to the photographing magnification calculated from the focal length and the photographing distance. The photographing distance refers to a distance between an imaging surface and a subject.

Third Embodiment

A third embodiment of the present invention will be described below.

In the first embodiment described above, a final image is acquired by cutting out the region determined by the framing information from the actually photographed image. However, if instability or the like occurs during the actual photographing and the main subject and the like do not fall within the photographing field angle, the main subject is not appropriately contained in the actually photographed image itself. In this case, an image with the framing intended by the photographer cannot be acquired by cutting out an image based on such an actually photographed image.

In view of such a case, in the present embodiment, whether or not the actually photographed image is appropriate as an original image for the final image cutout is determined, and the image is cut out using a pre-capture image acquired prior to the actual photographing when determined as being inappropriate (e.g., when photographing is performed with a part of the main subject missing). In the present embodiment, there is provided, for example, the known pre-capture mode (mode having a function of recording an image during release half-push by the photographer, and allowing the final image to be selectable from one of the actually photographed image or the image captured during the release half-push after the photographing operation). This embodiment can be applied to a camera or the like having an auto-select processing function of automatically selecting a final image.

The imaging system according to the present embodiment will be described below, focusing mainly on the features different from the first embodiment.

Figure 10:
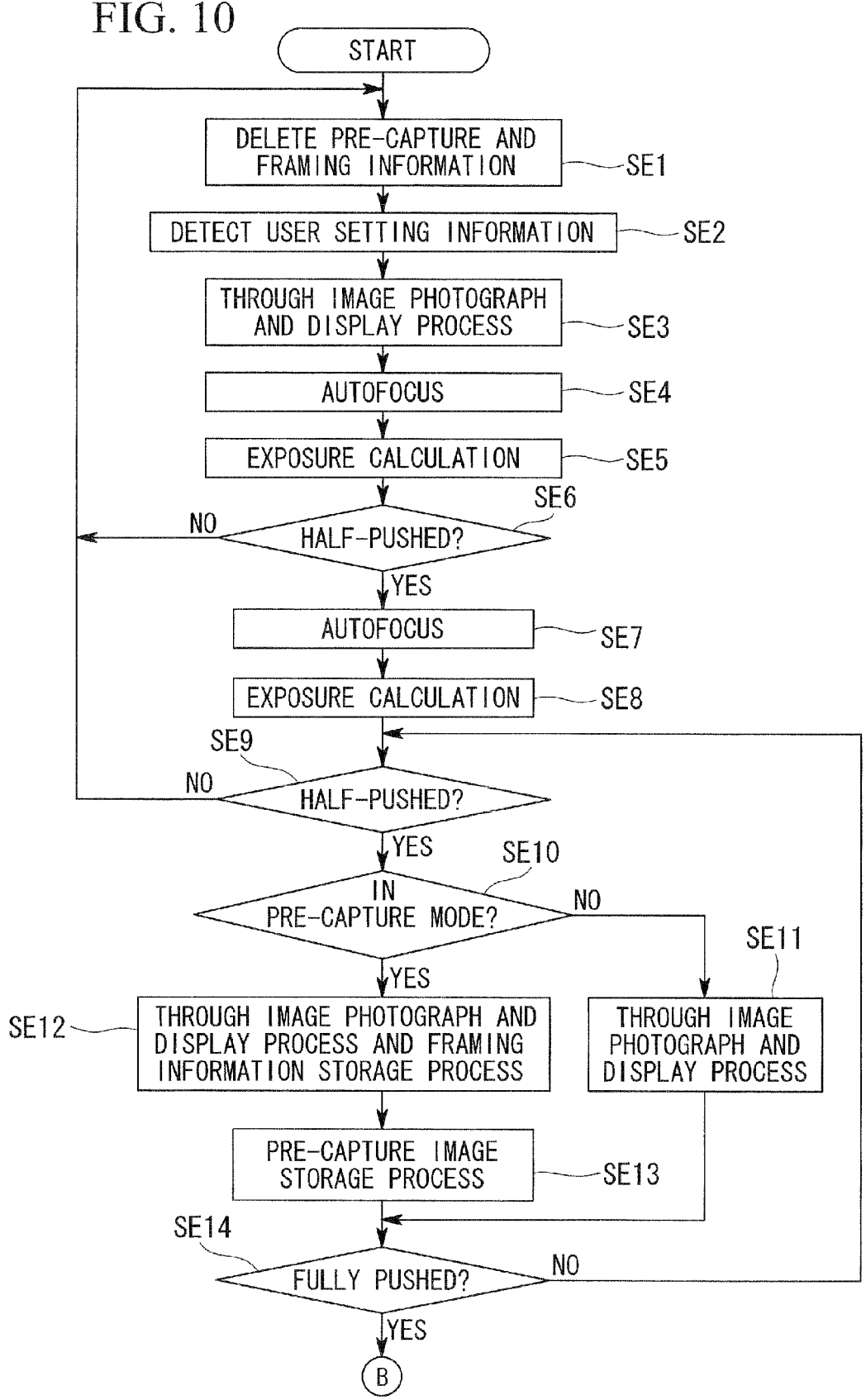
FIG. 10 is a view showing an outline of a sequence flow in an imaging system according to a third embodiment of the present invention.

FIG. 10 is a view showing an outline of a sequence flow in the imaging system according to the present embodiment. The configuration of the imaging system 1 according to the present embodiment is substantially the same as the imaging system according to the first embodiment shown in FIG. 1, and the configuration of the image processing unit 25 is also substantially the same as the configuration according to the first embodiment shown in FIG. 2. Thus, the following description will be made citing the configuration of FIG. 2.

In FIG. 10, the framing information and the pre-capture information are cleared when the power of the camera is turned ON by the photographer (step SE1). The framing information and the pre-capture information, which is to be described later, stored in the first storage unit 252 shown in FIG. 2 are thus deleted. The user setting information on the photographing mode, the zoom, and the like is then detected (step SE2).

The through image photograph and display process is then performed (step SE3), followed by the autofocus (step SE4) and the exposure calculation (step SE5). Whether or not the shutter button is half-pushed is then determined (step SE6), and the process returns to step SE1 if not half-pushed and the processes after step SE1 are repeatedly performed. If the shutter button is half-pushed, the autofocus (step SE7) and the exposure calculation (step SE8) are performed, and thereafter, whether or not the half-pushed state is released is again determined (step SE9).

When the half-pushed state is released as a result ("NO" in step SE9), the process returns to step SE1. When the half-pushed state is continued ("YES" in step SE9), whether or not the pre-capture mode is set is determined (step SE10). If the pre-capture mode is not set as a result, the through image photograph and display process is performed (step SE11), and then whether or not the shutter button is fully pushed is determined (step SE14).

On the other hand, if the pre-capture mode is set in step SE10, the through image photograph and display process and the framing information storage process (step SE12), as well as the pre-capture image storage process (step SE13) are performed, and then whether or not the shutter button is fully pushed is determined (step SE14).

The through image photograph and display process and the framing information storage process performed in step SE12 are similar to the processes shown in FIG. 6. The pre-capture image storage process includes creating a pre-capture image by performing a predetermined image process on the through image, and saving the acquired image. The storage unit for storing the pre-capture image is not particularly limited. For instance, the first storage unit 252 and the second storage unit 254 may be used, or a storage unit dedicated for the pre-capture image may be arranged.

Subsequently, if the shutter button is not fully pushed and the half-pushed state is stilled continued in the determination of step SE14 ("NO" in step SE14), the process returns to step SE9 and the processes after step SE9 are repeatedly performed. On the other hand, if determined that the shutter button is fully pushed in step SE14, the framing information acquiring process (step SE15 of FIG. 11) is executed, and then the actual photographing process is performed (step SE16). The framing information acquiring process is similar to that described in the first embodiment.

Whether or not the auto-select is set is then determined (step SE17), and if the auto-select is set, the image selection process (framing process) is performed (step SE18), and then the resizing process (step SE19), the image process (step SE20), and the image recording (step SE21) are performed. If the auto-select is not set in step SE17, the framing process is not performed and the resizing process and the like (steps SE19 and SE20) are performed on the actually photographed image, and then this image is stored (step SE21).

Figure 12:
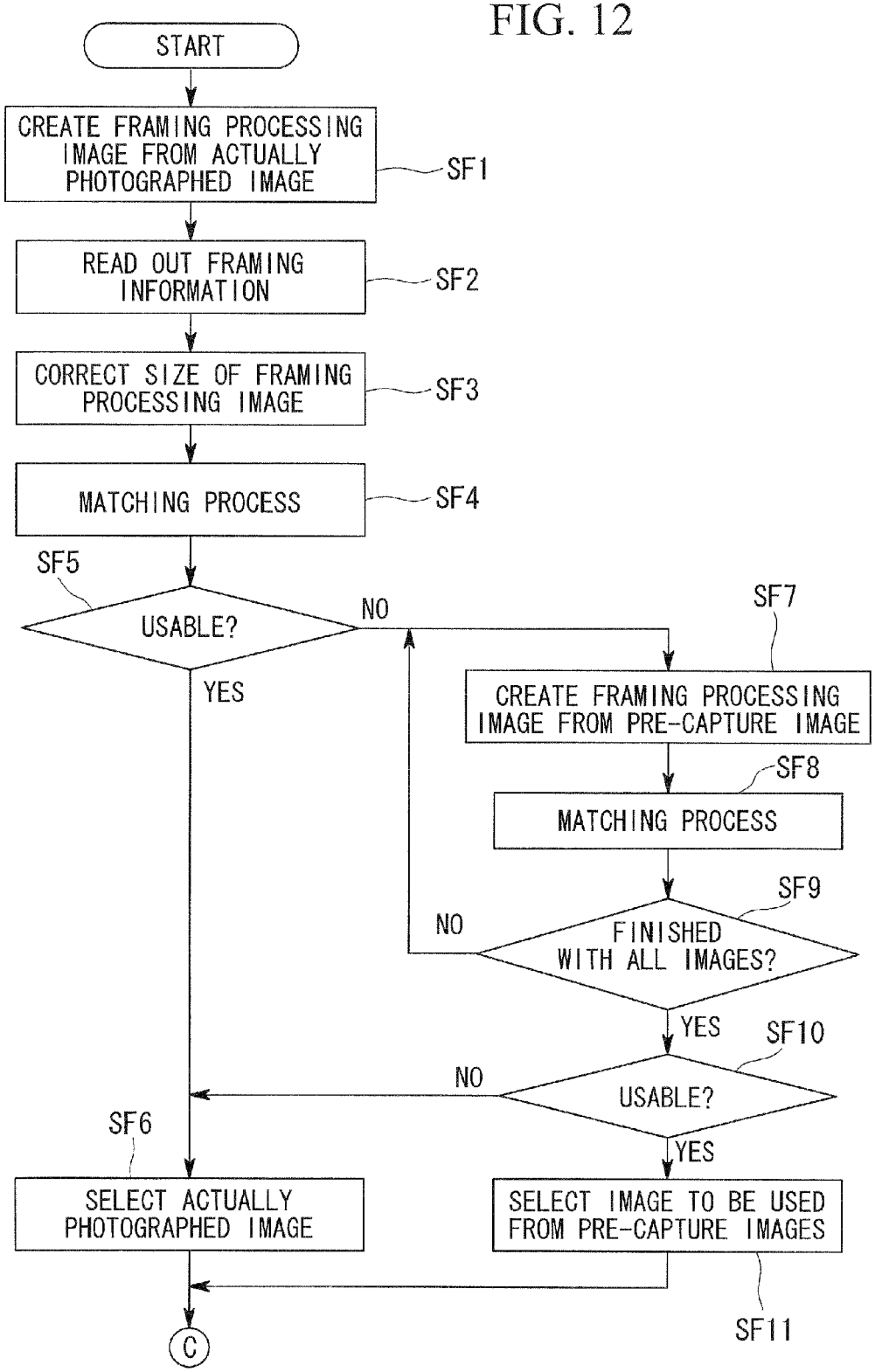
FIG. 12 is a flowchart showing processing procedures of an image selection process.

The image selection process (framing process) performed in step SE18 mentioned above will be described below with reference to FIG. 12. FIG. 12 is a flowchart showing the processing procedures of the image selection process (framing process). The framing process is performed by the trimming unit 256 shown in FIG. 2.

In FIG. 12, the actually photographed image is first acquired, and the processes such as the known OB subtraction process, the tone conversion process, the white balance adjustment process, and the monochrome process are performed on the actually photographed image to create an image (hereinafter referred to as "framing processing image") appropriate to be compared with the framing information (step SF1). In this case, the actually photographed image itself is assumed to be stored in the second storage unit 254, and a copy of the actually photographed image is processed and used.

Figure 11:
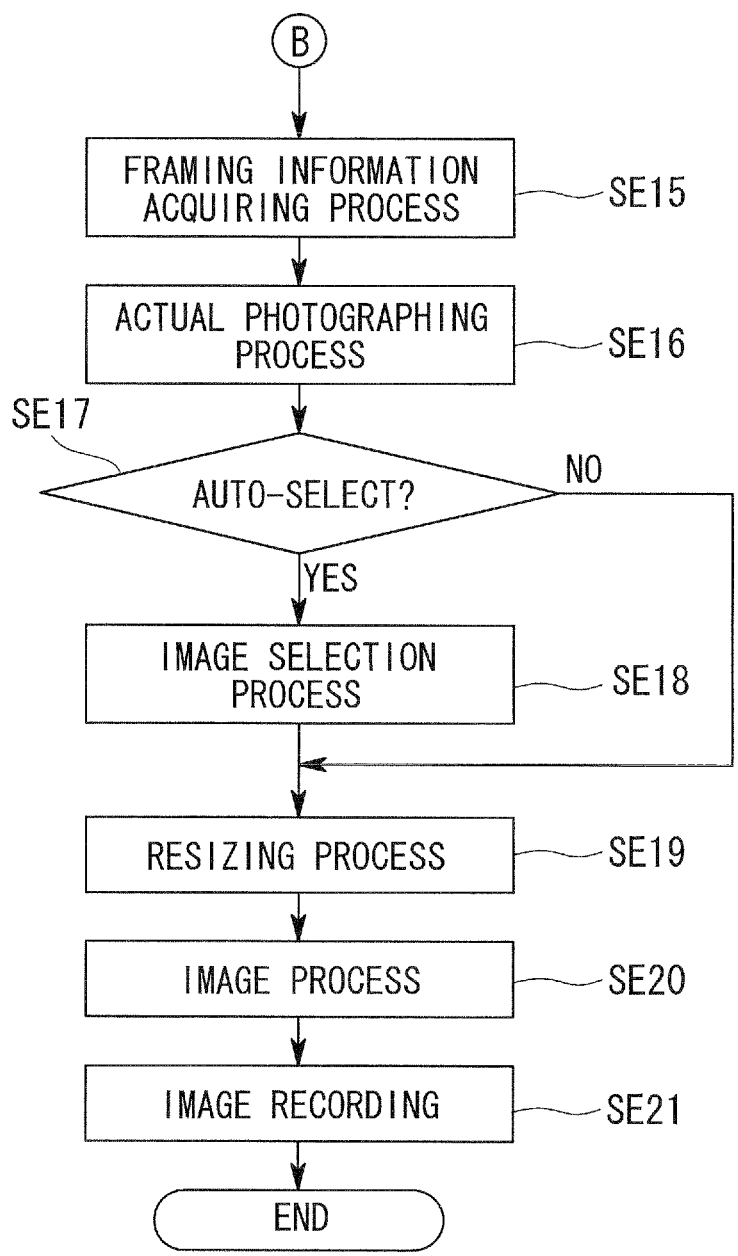
FIG. 11 is a view showing an outline of a subsequent sequence flow in the imaging system according to the third embodiment of the present invention.

The framing information acquired in step SE15 shown in FIG. 11 is then read out (step SF2), and the size of the framing processing image is corrected so as to have a photographing field angle same as that of the read framing information (step SF3).

Thereafter, the matching process is performed on the framing processing image in the corrected size and the framing information, and the framing position is determined (step SF4). The details of the matching process performed in this case are substantially similar to the process shown in FIG. 9.

Subsequently, it is determined whether or not to cut out the image using the actually photographed image acquired this time based on the degree of similarity calculated by the matching process (step SF5). For instance, if instability or the like occurs in the shutter operation during the actual photographing and the actually photographed image is acquired with the photographing field angle not intended by the photographer, the pre-capture image is sometimes preferably used as an original image for cutting out the final image rather than the actually photographed image. Thus, it is determined in step SF5 whether or not the actually photographed image can be used as an original image for cutting out the final image, based on the degree of similarity between the actually photographed image and the framing information.

If determined in step SF5 that the degree of similarity is greater than or equal to a predetermined value and that the actually photographed image is suited for the original image for cutting out the image, the process proceeds to step SF6, and the actually photographed image is selected as the original image for cutting out the image. If the degree of similarity is smaller than the predetermined value in step SF5, determination is made as not preferable to cut out the final image from the actually photographed image acquired this time, and whether or not a more preferable image exists in the pre-capture image is determined.

Specifically, the pre-capture image is first read out, and the processes such as the known OB subtraction process, the tone conversion process, the white balance adjustment process, and the monochrome process are performed on the pre-capture image to generate a framing processing image appropriate to be compared with the framing information (step SF7). In this case, the pre-capture image itself is assumed to be stored in a predetermined storage unit, and a copy of the pre-capture image is processed and used.

The degree of similarity is then calculated by matching the framing processing image and the framing information (step SF8). If generation of the framing processing image and the matching process with the framing information are performed with all the pre-capture images as the target ("YES" in step SF9), whether or not the pre-capture image with the degree of similarity greater than or equal to the predetermined threshold value exists in all the pre-capture images is determined (step SF10). If the pre-capture image with the degree of similarity greater than or equal to the predetermined threshold value does not exist ("NO" in step SF10), the actually photographed image is selected as the original image for cutting out the final image (step SF6).

On the other hand, if the pre-capture image with the degree of similarity greater than or equal to the predetermined threshold value exists in step SF10, the pre-capture image having the highest degree of similarity is selected as the original image for cutting out the image (step SF11).

Figure 13:
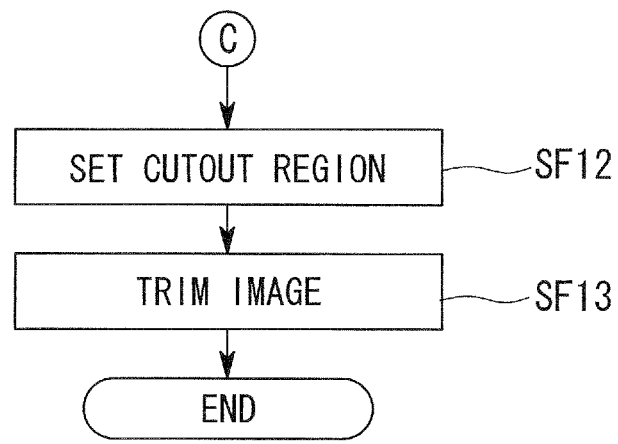
FIG. 13 is a flowchart showing subsequent processing procedures of the image selection process.

In this way, when the original image for cutting out the final image is specified, the image cutout region is set on the specified image in accordance with the framing information (step SF12 of FIG. 13), and the image in the set region is trimmed (step SF13).

As described above, according to the imaging system and the image processing method of the present embodiment, the image is cut out using the pre-capture image instead in a case where the actually photographed image is not suited as the original image for cutting out the image, and thus an image complying with the intention of the photographer can be acquired as the final image even if significantly failing in framing in the actual photographing.

Fourth Embodiment

A fourth embodiment of the present invention will be described below.

In the first embodiment described above, the through image is used as the framing information, but the face position in the through image is stored as the framing information in the present embodiment. The imaging system according to the present embodiment will be described below focusing mainly on the features different from the first embodiment.

Figure 14:
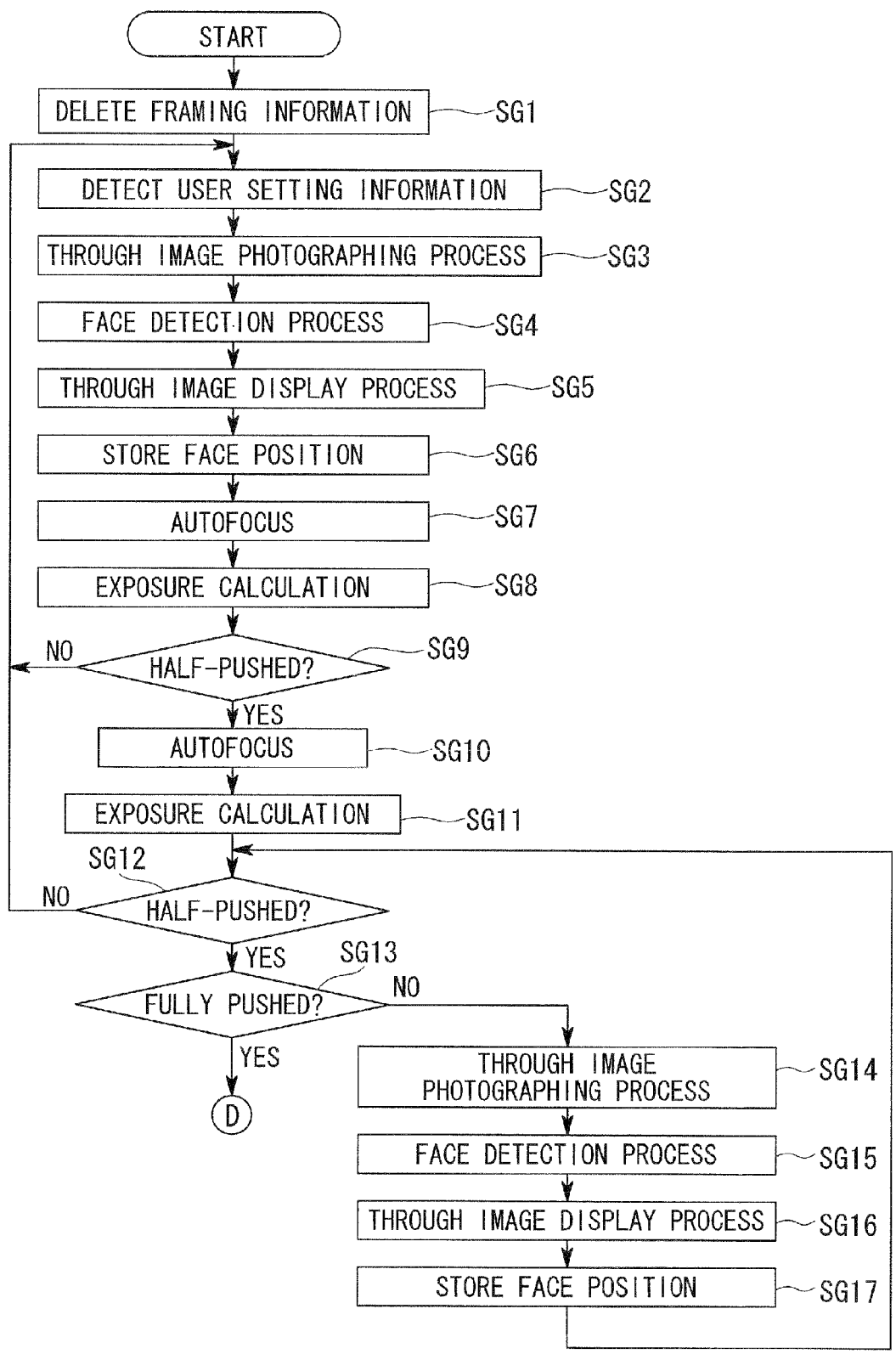
FIG. 14 is a view showing an outline of a sequence flow in an imaging system according to a fourth embodiment of the present invention.

FIG. 14 is a view showing an outline of a sequence flow in the imaging system according to the present embodiment. The configuration of the imaging system 1 according to the present embodiment is substantially the same as the configuration of the imaging system according to the first embodiment shown in FIG. 1, and the configuration of the image processing unit 25 is also substantially the same as the configuration according to the first embodiment shown in FIG. 2. Thus, the following description will be made citing the configuration of FIG. 2.

In FIG. 14, the memory for framing is cleared when the power of the camera is turned ON by the photographer (step SG1). The framing information stored in the first storage unit 252 shown in FIG. 2 is thus deleted. The user setting information on the photographing mode, the zoom, and the like is then detected (step SG2).

The through image photographing process is then performed (step SG3), the face detection process (step SG4) on the acquired through image and the through image display process (step SG5) are performed, and the face position is stored in the first storage unit 252 as the framing information (step SG6).

The face detection is performed in accordance with, for example, the Viola-Jones face detection method disclosed in P. Viola and M. Jones, "Rapid object detection using a boosted cascade of simple features" Proc. of CVPR, 2001.

The autofocus (step SG7) and the exposure calculation (step SG8) are then performed, and whether or not the shutter button is half-pushed is determined (step SG9). If not half-pushed, the process returns to step SG2, and the processes after step SG2 are repeatedly performed. On the other hand, if the shutter button is half-pushed in step SG9, the autofocus (step SG10) and the exposure calculation (step SG11) are performed, and thereafter, whether or not the half-pushed state is released is again determined (step SG12).

If the half-pushed state is released as a result ("NO" in step SG12), the process returns to step SG2. If the half-pushed state is continued, whether or not the shutter button is fully pushed is determined (step SG13). If the shutter button is not fully pushed and the half-pushed state is still continued as a result ("NO" in step SG13), the through image photographing process (step SG14), the face detection process in the through image (step SG15), the through image display process (step SG16), and the face position storage process (step SG17) are performed, and the process returns to step SG12.

Figure 15:
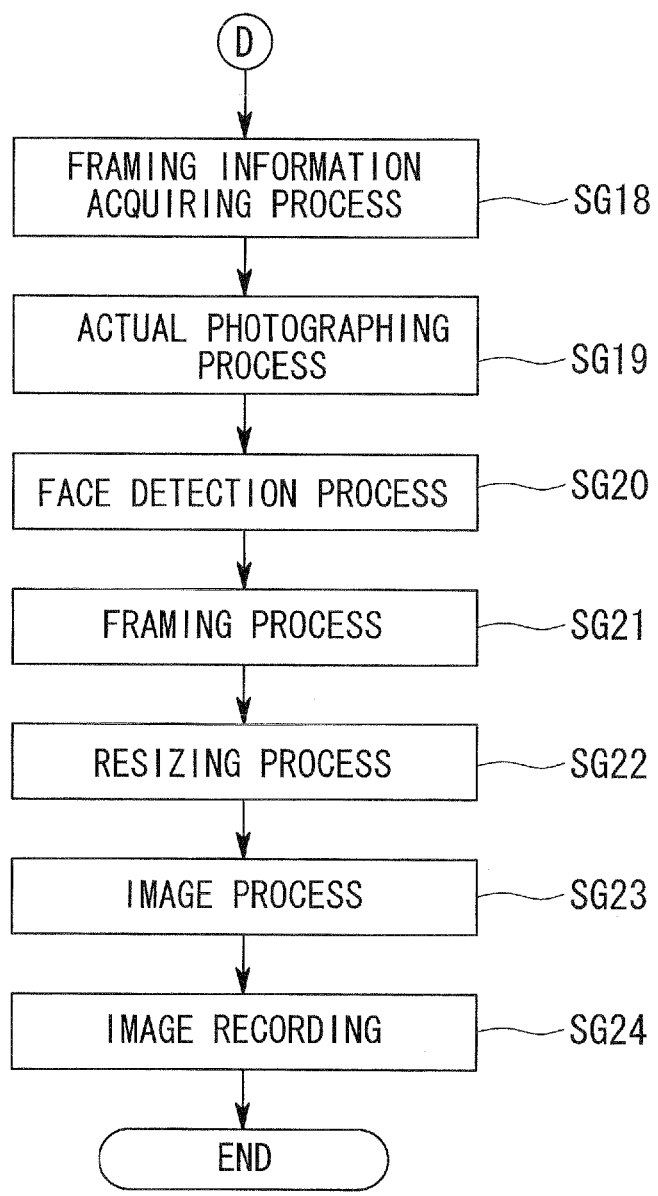
FIG. 15 is a view showing an outline of a subsequent sequence flow in the imaging system according to the fourth embodiment of the present invention.

On the other hand, if determined that the shutter button is fully pushed in step SG13 ("YES" in step SG13), the framing information acquiring process (step SG18 of FIG. 15) is executed, and then the actual photographing process is performed (step SG19). Subsequently, the face detection process is performed on the actually photographed image acquired in the actual photographing process (step SG20), and thereafter, the final image acquired through the framing process (step SG21), the resizing process (step SG22), the image process (step SG23) is stored in the recording medium 43 (step SG24).

According to the imaging system of the present embodiment, the face position in the through image is stored as the framing information instead of storing the through image as the framing information, and thus the volume of data can be greatly reduced compared to an image being stored. The load on the memory therefore can be reduced.

In the embodiment described above, the face recognition is performed on the through image and the position of the face is set as the framing information. Alternatively, the position and the size of the face, the positional information of the building, and the positional information of the person may be stored as the framing information.

Fifth Embodiment

A fifth embodiment of the present invention will be described below.

In the first embodiment described above, one through image is acquired in synchronization with the photographing operation by the photographer out of the through images stored as the framing information, and the image is cut out with use of the through image as the framing information. In the present embodiment, the through image is not stored but the most recent image at the time when and the photographing operation is performed by the photographer is used as the framing information.

For instance, the image displayed in the through image and the finally acquired image sometimes differ from each other. This is because there is a time difference between the image displayed in the through image and the actually photographed image acquired by fully pushing the shutter button.

According to the present embodiment, the through image displayed as the through image when the shutter button is fully pushed is stored as the framing information, and the actually photographed image is cut out using such framing information to acquire the final image.

Therefore, according to the imaging system of the present embodiment, the volume of memory can be reduced since only the through image at the time when the shutter button is fully pushed is stored as the framing information and used for cutting out the image, without sequentially storing the through images as the framing information. Furthermore, although there is a slight time difference from the intention of the photographer in comparison to the previous embodiments since the image at the time when the shutter button is fully pushed is assumed as the framing intended by the photographer, it is effective with small volume of memory since it is sufficiently close to the framing intended by the photographer compared to the actually photographed image.

In the above-described embodiment, the processes are assumed to be performed by hardware as the image processing device 3, but the present invention is not limited to such a case. For instance, a configuration of processing with use of separate software may be adopted. In this case, the image processing device 3 includes a main storage device such as a CPU or a RAM, and a computer readable recording medium for recording a program for implementing all or part of the above processes. The CPU reads out the program recorded in the storage medium and executes the processing and calculation on the information to perform the processes similar to those of the image processing device 3.

The computer readable recording media include a magnetic disc, a magnetic optical disc, a CD-ROM, a DVD-ROM, a semiconductor memory, and the like. The computer program may be distributed to a computer by way of a communication line, so that the computer receiving the distributed program executes this program.

What is claimed is:

1. An imaging system comprising:
   a display unit which displays a through image with a first photographing field angle set by a photographer;

a photographing operation detection unit which detects a photographing operation by the photographer;

an imaging unit which acquires an actually photographed image with a second photographing field angle wider than the first photographing field angle, when the photographing operation is performed;

a framing information acquiring unit which acquires framing information related to framing with the first photographing field angle at a time of one of the photographing operation and immediately before the photographing operation, when the photographing operation is performed; and a trimming unit which trims the actually photographed image acquired with the second photographing field angle by the imaging unit, based on the framing information acquired with the first photographing field angle by the framing information acquiring unit, wherein the framing information acquired by the framing information acquiring unit is related to the through image displayed on the display unit with the first photographing field angle at the time of one of the photographing operation and immediately before the photographing operation, and wherein only an image with the first photographing field angle is displayed as the through image on the display unit.

2. The imaging system according to claim 1, wherein the trimming unit sets a cutout region on the actually photographed image based on the framing information acquired with the first photographing field angle by the framing information acquiring unit, and trims the actually photographed image along the cutout region.

3. The imaging system according to claim 1, further comprising:

a framing information creating unit which creates the framing information by cutting out the through image with the first photographing field angle; and a storage unit which stores the framing information created by the framing information creating unit, wherein the framing information acquiring unit acquires one of a plurality of pieces of framing information from the storage unit based on a timing of the photographing operation.

4. The imaging system according to claim 1, wherein the trimming unit matches the framing information as an image acquired with the first photographing field angle by the framing information acquiring unit and the actually photographed image, and sets a cutout region in a region of a highest degree of similarity and having a size which is the same as a size of the framing information.

5. The imaging system according to claim 1, further comprising a main subject recognition unit which recognizes a main subject in the through image and the actually photographed image, wherein the framing information acquired by the framing information acquiring unit is related to the main subject in the through image acquired with the first photographing field angle at the time of one of the photographing operation by the photographer and immediately before the photographing operation.

6. The imaging system according to claim 5, wherein the trimming unit sets a cutout region so that a position of the main subject in the actually photographed image matches a position of the main subject acquired as the framing information.

7. The imaging system according to claim 1, further comprising a storage unit which stores a pre-capture image acquired prior to actual photographing, wherein the trimming unit selects one of the actually photographed image and the pre-capture image, sets a cutout region on the selected image based on the framing information, and trims the selected image along the cutout region.

8. The imaging system according to claim 1, wherein a difference between the first photographing field angle and the second photographing field angle is determined based on at least one of a focal length and a photographing distance at the time of actual photographing.

9. An imaging system comprising:

a display unit which displays a through image with a first photographing field angle set by a photographer;

a photographing operation detection unit which detects a photographing operation by the photographer;

an imaging unit which acquires the through image prior to the photographing operation, and acquires an actually photographed image with a second photographing field angle wider than the first photographing field angle, when the photographing operation is performed;

a framing information acquiring unit which acquires framing information created based on the through image and related to framing with the first photographing field angle at a time of one of the photographing operation and immediately before the photographing operation, when the photographing operation is performed; and a trimming unit which trims the actually photographed image acquired with the second photographing field angle by the imaging unit, based on the framing information acquired with the first photographing field angle by the framing information acquiring unit, wherein the framing information acquired by the framing information acquiring unit is related to the through image displayed on the display unit with the first photographing field angle at the time of one of the photographing operation and immediately before the photographing operation, and wherein only an image with the first photographing field angle is displayed as the through image on the display unit.

10. The imaging system according to claim 9, wherein the trimming unit sets a cutout region on the actually photographed image based on the framing information acquired with the first photographing field angle by the framing information acquiring unit, and trims the actually photographed image along the cutout region.

11. The imaging system according to claim 9, further comprising:

a framing information creating unit which creates the framing information by cutting out the through image with the first photographing field angle; and a storage unit which stores the framing information created by the framing information creating unit, wherein the framing information acquiring unit acquires one of a plurality of pieces of framing information from the storage unit based on a timing of the photographing operation.

12. The imaging system according to claim 9, wherein the trimming unit matches the framing information as an image acquired with the first photographing field angle by the framing information acquiring unit and the actually photographed image, and sets a cutout region in a region of a highest degree of similarity and having a size which is the same as a size of the framing information.

13. The imaging system according to claim 9, further comprising a main subject recognition unit which recognizes a main subject in the through image and the actually photographed image,
wherein the framing information acquired by the framing information acquiring unit is related to the main subject in the through image acquired with the first photographing field angle at the time of one of the photographing operation by the photographer and immediately before the photographing operation.

14. The imaging system according to claim 13, wherein the trimming unit sets a cutout region so that a position of the main subject in the actually photographed image matches a position of the main subject acquired as the framing information.

15. The imaging system according to claim 9, further comprising a storage unit which stores a pre-capture image acquired prior to actual photographing,
wherein the trimming unit selects one of the actually photographed image and the pre-capture image, sets a cutout region on the selected image based on the framing information, and trims the selected image along the cutout region.

16. The imaging system according to claim 9, wherein a difference between the first photographing field angle and the second photographing field angle is determined based on at least one of a focal length and a photographing distance at the time of actual photographing.

17. An image processing method comprising:
displaying a through image with a first photographing field angle set by a photographer;
detecting a photographing operation by the photographer;
when the photographing operation is performed, acquiring an actually photographed image with a second photographing field angle wider than the first photographing field angle;
when the photographing operation is performed, acquiring framing information related to framing with the first photographing field angle at a time of one of the photographing operation and immediately before the photographing operation; and
trimming the actually photographed image acquired with the second photographing field angle, based on the acquired framing information with the first photographing field angle,
wherein the acquired framing information is related to the through image displayed with the first photographing field angle at the time of one of the photographing operation and immediately before the photographing operation, and
wherein only an image with the first photographing field angle is displayed as the through image.

18. A non-transitory computer-readable recording medium having stored thereon an image processing program which is executable by a computer to perform functions comprising:
displaying a through image with a first photographing field angle set by a photographer;
when a photographing operation is performed by the photographer, acquiring an actually photographed image with a second photographing field angle wider than the first photographing field angle;
when the photographing operation is performed, acquiring framing information related to framing with the first photographing field angle at a time of one of the photographing operation and immediately before the photographing operation; and
trimming the actually photographed image acquired with the second photographing field angle, based on the acquired framing information with the first photographing field angle,
wherein the acquired framing information is related to the through image displayed with the first photographing field angle at the time of one of the photographing operation and immediately before the photographing operation, and
wherein only an image with the first photographing field angle is displayed as the through image.

* * * * *